United States Patent
Hu et al.

(10) Patent No.: US 6,355,596 B2
(45) Date of Patent: Mar. 12, 2002

(54) METHOD FOR PREPARING TITANIUM ON SILICA CATALYSTS WITH CONTROLLED DISTRIBUTIONS

(75) Inventors: Yatao Hu, Wayne; Anthony L. Dent, King of Prussia, both of PA (US)

(73) Assignee: PQ Holding, Inc., Wilmington, DE (US)

( * ) Notice: Subject to any disclaimer, the term of this patent is extended or adjusted under 35 U.S.C. 154(b) by 0 days.

(21) Appl. No.: 09/323,731

(22) Filed: Jun. 1, 1999

(51) Int. Cl.[7] .......................... B01J 21/06; B01J 21/08; B01J 37/03; B01J 37/02
(52) U.S. Cl. ..................... 502/350; 502/239; 502/242
(58) Field of Search ............................. 502/350, 239, 502/242

(56) References Cited

U.S. PATENT DOCUMENTS

| | | |
|---|---|---|
| 3,166,542 A | 1/1965 | Orzechowski et al. |
| 3,220,959 A | 11/1965 | Orzechowski |
| 3,274,120 A | 9/1966 | Aftandilian |
| 3,972,833 A | 8/1976 | Michalko et al. |
| 4,218,345 A * | 8/1980 | Hoff et al. |
| 4,294,724 A * | 10/1981 | McDaniel .................. 502/239 |
| 4,296,001 A | 10/1981 | Hawley |
| 4,345,055 A * | 8/1982 | Hawley ...................... 502/239 |
| 4,368,303 A | 1/1983 | McDaniel |
| 4,422,959 A | 12/1983 | Lawson et al. |
| 4,434,243 A * | 2/1984 | Martin ........................ 502/242 |
| 4,547,283 A | 10/1985 | Neel et al. |
| 4,596,786 A * | 6/1986 | Kukes et al. ............... 502/242 |
| 5,625,013 A | 4/1997 | Mueller et al. |

FOREIGN PATENT DOCUMENTS

| | | |
|---|---|---|
| CA | 1064008 | 10/1979 |
| EP | 0 734 764 | 10/1996 |
| GB | 2 310 384 | 8/1997 |

OTHER PUBLICATIONS

U.S. application No. 09/134,445, Canessa et al., filed Aug. 14, 1998.

International Search Report dated Sep. 21, 2000.

\* cited by examiner

Primary Examiner—Steven P. Griffin
Assistant Examiner—Christina Ildebrando
(74) Attorney, Agent, or Firm—Ratner & Prestia

(57) ABSTRACT

A method for preparing a titanium on silica catalyst, in the form of formed particles such as macrospheres, achieves a controlled titanium distribution type, namely either uniform, eggshell, or intermediate, by selecting the particular titanium precursor depending on its reactivity with hydroxyl groups and by selecting the molar titanium:hydroxyl ratio. Selecting a titanium precursor with a low reactivity and/or adding sufficient titanium precursor to achieve a high molar titanium:hydroxyl ratio aids in forming a uniform distribution of titanium. On the other hand, selecting a titanium precursor with a high reactivity and/or adding only a little titanium precursor resulting in a low molar titanium:hydroxyl ratio aids in forming an eggshell distribution of titanium. Preferred titanium precursors for aiding in the formation of an eggshell distribution of titanium include n-propyl titanate and n-butyl titanate, and preferred titanium precursors for aiding in the formation of a uniform distribution of titanium include titanocene and titanium acetylacetonate. Such silica on titanium catalysts can be used to make epoxidation catalysts, oxidation catalysts, hydroxylation catalysts, and the preferred distribution type depends on the particular application.

9 Claims, 8 Drawing Sheets

METHOD FOR PREPARING TITANIUM ON SILICA CATALYSTS WITH CONTROLLED DISTRIBUTIONS

FIELD OF THE INVENTION

This invention relates to titanium on silica catalysts and methods for preparing such catalysts.

BACKGROUND OF THE INVENTION

Titanium on silica catalysts have been known to be effective in catalyzing epoxidation reactions. For example, U.S. Pat. No. 4,021,454 to Wulff et al. describes the use of such catalysts to epoxidize substituted olefins, such as allyl methyl ether to form 2,3-epoxypropyl methyl ether. Titanium on silica catalysts can also be used in other reactions including, but not limited to, olefin polymerization, hydroxylation, and isomerization.

A number of characteristics are important in determining the usefulness of titanium on silica catalysts. In addition to the physical strength and the attrition resistance of a catalyst, the activity of a catalyst, defined by the reaction rate per unit weight of catalyst, is an important characteristic. In general, it is believed that the activity of a titanium on silica catalyst is dependent on the amount of active titanium present on the silica gel. As used herein, the phrase "active titanium" means a titanium compound which is chemically bound to the silica gel and serves to facilitate whatever reaction (e.g., epoxidation) which that catalyst is used for. Such active titanium typically exists in the form of $Ti(OH)_x$, wherein x is 1, 2, or 3, with titanium also typically bound to 1, 2, or 3 silicon atom(s) inherent to the silica gel.

Not only is the amount of titanium on the silica gel important in most reactions, the distribution of titanium on a given formed silica gel particle, for example, a macrosphere, an extrudate, or a pellet, is important in many applications. Formed silica gel particles such as macrospheres, extrudates, or pellets are known to those skilled in the art. The term "macrosphere" is discussed in more detail below but, in general, is a conglomeration of silica gel particles formed into a spherical shape upon ejection of a silica hydrosol solution from a nozzle. The kinetics of the particular reaction for which the catalyst is used are relevant for determining the type of distribution of titanium on a given formed silica gel particle. For example, if the reaction must occur very quickly (e.g., the system provides for only a short residence time of the reactants with the catalyst), it would be optimal to use a macrosphere having an eggshell type distribution. As used herein, the phrase "eggshell distribution" means titanium concentration levels along an exposed diameter of a macrosphere which generally peak near the ends of the diameter and flatten towards the middle and specifically at least 60% of the total titanium is within 20% of both ends and the minimum concentration towards the middle is no more than 10% of the peak concentration. If a macrosphere having a uniform distribution is used for such a reaction, then some of the titanium in the interior of the macrosphere would not be utilized. Such reactions include the combustion of fuel in an automotive vehicle.

On the other hand, a uniform distribution of titanium is desirable in some systems. As used herein, the phrase "uniform distribution" means titanium concentration levels along an exposed diameter of a macrosphere which do not vary by more than 20% from an average titanium concentration at any one point along the diameter, excluding data points within 5% of each end of the diameter at which points data from known analytical methods can be unreliable. Characteristics of such systems might include reactants which react relatively slowly in relation to the time it takes for the reactants to diffuse into the macrospheres. In such cases, an eggshell distribution would be inefficient in that some of the reactants which had diffused to the interior of the macrosphere would be lacking active titanium sites. Such reactions might possibly include hydroxylation. It might be desirable to prepare a silica gel macrosphere having a titanium distribution between uniform and eggshell. As used herein, the phrase "intermediate distribution" shall include all types of titanium distributions other than uniform and eggshell.

To date, there is no indication of how to control the type of distribution of titanium on a silica gel macrosphere. For the reasons discussed above, such a method would be useful.

SUMMARY OF THE INVENTION

The present invention is directed to methods for a catalyst having a particular titanium distribution type, which can be controlled by selecting the particular titanium precursor and the molar titanium:hydroxyl ratio. By varying one or both of these factors, either a uniform, eggshell, or intermediate distribution of titanium can be achieved or more closely approximated.

The method of the present invention is carried out by first preparing formed silica hydrogel particles containing water and having a hydroxyl concentration and a hydroxyl distribution, then drying the formed silica hydrogel particles to remove substantially all of the water. After selecting a particular titanium precursor having a certain reactivity with hydroxyl groups, the formed silica gel particles are contacted with the titanium precursor in an amount to achieve a molar titanium:hydroxyl ratio. It has been recognized that the primary factors in determining the titanium distribution type are the reactivity of the titanium precursor and the molar titanium:hydroxyl ratio. Specifically, increasing the reactivity and/or decreasing the molar titanium:hydroxyl ratio aids in forming an eggshell distribution, while decreasing the reactivity and/or increasing the molar titanium:hydroxyl ratio aids in forming a uniform distribution. By contacting the formed silica gel particles with the titanium precursor, titanium-impregnated formed silica gel particles are formed then recovered as the catalyst.

The present invention also provides a method for preparing a catalyst having either a uniform distribution or an eggshell distribution, or more closely approximating one of these distributions. In order to attain or more closely approximate a catalyst having a uniform distribution, a titanium precursor with a relatively low reactivity is used and/or a relatively high molar titanium:hydroxyl ratio is used. On the other hand, in order to attain or more closely approximate a catalyst having an eggshell distribution, a titanium precursor with a relatively high reactivity is used and/or a relatively low molar titanium:hydroxyl ratio is used.

The present invention also provides methods for preparing a catalyst having a uniform distribution of titanium and for preparing a catalyst having an eggshell distribution of titanium by using specific titanium precursors and specific molar titanium:hydroxyl ratios. In particular, to prepare a catalyst having a uniform distribution of titanium, the titanium precursor is selected from the group consisting of titanocene, titanium acetylacetonate, isopropyl titanate-acetylacetone complex, and triethanolamine titanate and the titanium precursor is added in an amount to achieve a molar titanium:hydroxyl ratio from about 0.25:1 to about 3:1. Similarly, to prepare a catalyst having an eggshell distribution of titanium, the titanium precursor is selected from the group consisting of ethyl titanate, n-propyl titanate, isopropyl titanate, isobutyl titanate, and n-butyl titanate and the titanium precursor is added in an amount to achieve a molar titanium:hydroxyl ratio from about 0.03:1 to about 0.25:1.

The invention is also directed to the titanium on silica catalysts made by the processes described herein.

It is to be understood that both the foregoing general description and the following detailed description are exemplary, but are not restrictive, of the invention.

BRIEF DESCRIPTION OF THE DRAWING

The present invention is best understood when read in view of the drawing in which.

DETAILED DESCRIPTION OF THE INVENTION

Figure 1:
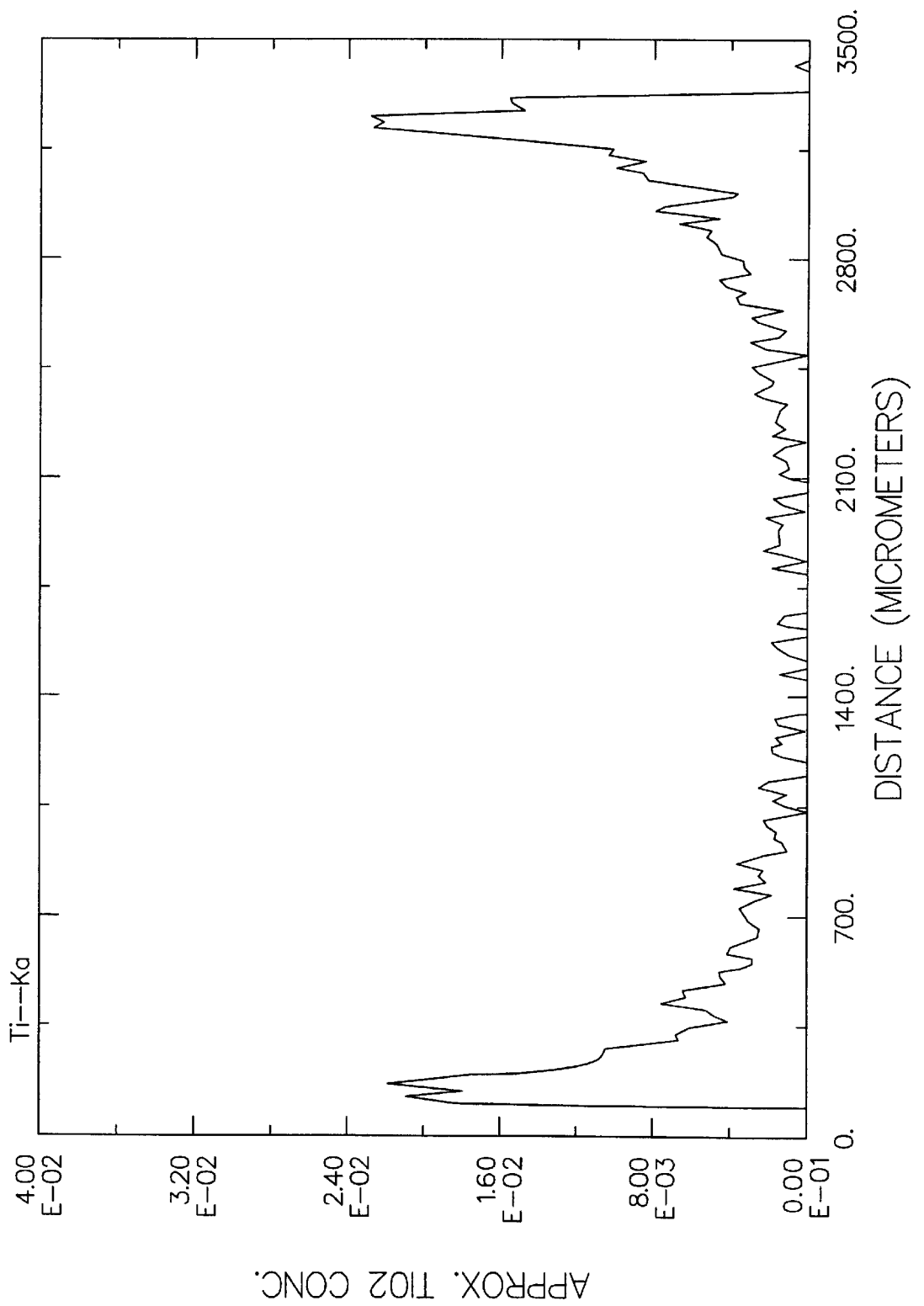
FIGS. 1–8 depict graphical representations showing the distribution of titanium from one end to another across an exposed diameter of the macrospheres described in the Examples below.

The present invention is directed to titanium on silica catalysts having a controlled distribution type of titanium. Such catalysts are useful for catalyzing epoxidation reactions. Other uses of the titanium on silica catalysts of the present invention are also possible, including, but not limited to, olefin polymerization, hydroxylation, and isomerization. The catalysts of the present invention can be used as catalysts in a fixed bed reactor.

In general, five steps (and an optional calcining step) are involved in preparing the titanium on silica catalysts of the present invention and are carried out in the following order:

1. preparing formed silica hydrogel particles containing water and having a hydroxyl concentration and a hydroxyl distribution;
2. drying the formed silica hydrogel particles to remove substantially all of the water, thereby leaving formed silica gel particles;
3. (optional) calcining the dried formed silica gel particles for a time and at a temperature sufficient to reduce the hydroxyl concentration;
4. selecting a titanium precursor having a reactivity;
5. contacting the formed silica gel particles with the titanium precursor in an amount to achieve a molar titanium:hydroxyl ratio, wherein the reactivity and the ratio are selected to determine the particular titanium distribution type, to form titanium-impregnated formed silica gel particles; and
6. recovering the titanium-impregnated formed silica gel particles as the catalyst.

Step 1 above, preparing formed silica hydrogel particles, such as macrospheres, containing water and having a hydroxyl concentration and a hydroxyl distribution, is well known in the art. The formed silica hydrogel particles used in connection with the present invention can be made by art-accepted processes using methods of preparation and purification known in the prior art. For example, the silica supports used in connection with the present invention can be prepared by the methods described in U.S. Pat. Nos. 4,422,959 to Lawson et al., 3,972,833 to Michalko et al., or 5,625,013 to Mueller et al. or Canadian Patent No. 1,064,008 to van Beem et al., each of which is incorporated by reference herein. Preferably, and as described in more detail below, methods similar to those described in U.S. patent application Ser. No. 09/134,445 now U.S. Pat. No. 6,248,911, entitled PROCESS AND COMPOSITION FOR REFINING OILS USING METAL-SUBSTITUTED SILICA XEROGELS, incorporated herein by reference, are used to prepare the macrospheres (which are referred to as "hydrosol beads" in that application), except that no metal substitution step is needed in this invention.

More specifically, and preferably, silica hydrosols are formed by simultaneously and instantaneously mixing aqueous solutions of an acid and sodium or potassium silicate. For example, an acid source may be used to supply an acid, such as sulfuric acid, nitric acid, or hydrochloric acid, which is combined with the sodium or potassium silicate solution from a silicate solution source. The concentrations and flow rates or proportions are adjusted so that the hydrosol contains about 5 to 14% $SiO_2$ and so that substantially all of the alkali metal present in the silicate solution is neutralized. The silicate/acid mixture is then forced through a conventional nozzle in a known way. From the nozzle, the mixture forms hydrosol beads, which are allowed to set quickly to form a hydrogel, all in a known manner. Such hydrosols gel rapidly and are allowed to gel in a mass as the silica hydrogel macrospheres. In one embodiment, the hydrosol contains about 10% $SiO_2$, has a pH above about 8, and gels in a matter of 20 to 1,000 milliseconds. Such hydrogel macrospheres are preferably formed into spheres by spraying in air. These spheres are then preferably collected in an aqueous solution containing water and/or water with one or more inorganic salts, e.g., sodium sulfate, magnesium sulfate, ammonium sulfate, calcium chloride, potassium sulfate, sodium chloride, ammonium chloride, magnesium chloride, and potassium chloride. The hydrogel macrospheres are aged under carefully controlled conditions, such as at a pH of between about 7–11, at a temperature of from about 50 to 100° C. for about 4 to 40 hours. This aging, or "steeping," serves to decrease the surface area of the silica gel particles. More specifically, as reaction time, temperature and pH are increased, the surface area of the silica gel particles will decrease.

After the aging period, the silica spheres are washed with acidified water with a pH between about 1 and 5 to remove most or all of the water-soluble salts from the silica hydrogel macrospheres. Multiple washings may occur with the effluent being withdrawn and the washed silica hydrogel macrospheres being captured.

The size of the macrospheres is preferably between about 0.2 mm to about 8 mm, more preferably between about 1 mm to about 4mm, and most preferably between about 2 mm and 4 mm. The size of the macrospheres is a function of the nozzle diameter, the force applied through the nozzle, the viscosity of the silica hydrosol, and the temperature of the hydrosol and the environment where the gels are forming. The macrosphere sizes given above can be attained in a known manner.

The silica hydrogel particles, which conglomerate to form the formed silica hydrogel particles, suitable for this invention may have surface areas from about 100 to about 600 $m^2/g$, preferably between about 200 and 400 $m^2/g$. The pore volumes of the silica hydrogel particles of the present invention can vary over a wide range, such as from about 3 to about 9 cc/g, preferably between about 5 to about 7 cc/g.

Methods for achieving the above properties are well-known in the art. For example, exposing the silica gel to elevated temperatures at alkaline pH leads to a rearrangement of the gel structure; surface area is reduced and the mean pore diameter of the final product is increased. This process is known in the art as "hydrothermal treatment." An acid-set gel needs to be adjusted to alkaline or neutral pH for this to occur, but an alkaline-set gel needs only be held at an elevated temperature for some period of time. Drying conditions will also affect porosimetry properties; rapid drying tends to result in higher pore volumes. The silica content of the hydrosol also affects porosimetry. All of these effects are well-known to those skilled in the art and are described in many publications and patents.

It has been discovered that the diffusion coefficient of the formed silica gel particles remains over a fairly narrow range despite varying the process conditions by which the formed silica gel particles are formed. In some embodiments according to the invention, a macrosphere, which has been evacuated to remove the air, having a diameter of 4 mm made from the specific process described above takes on the order of about two to four minutes to fully diffuse (i.e., when an organic solvent has penetrated into and fully occupies all inner spaces occupied by air prior to evacuation). On the other hand, a similar macrosphere which has not been evacuated takes a few minutes more to fully diffuse. This diffusion range is within the range of reaction rates of the titanium precursor subsequently used, and the reaction rates of various suitable titanium precursors varies over a relatively much wider range than the diffusion rates. Accordingly, because the diffusion rate varies only slightly, the reactivity of the titanium precursor is the more important factor in determining distribution type of a particular system, and, in general, any changes in diffusion coefficient do not play a significant role in determining the distribution type.

Step 2 listed above, drying the formed silica hydrogel particles to remove substantially all of the water molecules within the formed silica hydrogel particles, is done to avoid any subsequent reaction between any water remaining on the macrospheres and the titanium precursor. For example, U.S. Pat. Nos. 3,166,542 to Orzechowski et al. and 3,220,959 to Orzechowski stress the importance of drying the silica gel before and keeping the silica gel dry during the impregnation of titanium (and other metals) onto the silica gel. As described in these patents, if the silica gel is not maintained essentially free of molecular water in any form, then the desired reaction between the metal and the silica gel does not predominate. In the case of titanium on silica catalysts, the desired reaction is the reaction between the titanium compound being added and silanol groups of the silica gel. If moisture is present, the titanium compound more readily reacts with water to form bulk phase $TiO_2$, which does not facilitate the catalytic reaction and therefore is not active titanium available to serve a catalytic function.

Therefore, it is desirable that the drying step is carried out until less than 2% water by weight, and most preferably less than 0.05% water by weight, resides within the formed silica gel particles. This can be accomplished in most systems by drying at a temperature of about 120° C. for a time of about 12 hours for removing water to a level of at most 0.5% by weight. The drying step should be carried out in the absence of water. A second drying step using a vacuum oven at 150° C. for 4 hours is preferably used prior to contacting with a titanium compound to minimize water content, just before exposure to titanium.

After drying the formed silica hydrogel particles, an optional, but in some cases preferred, step is to calcine the dried formed silica gel particles for a time and at a temperature sufficient to reduce the hydroxyl concentration and to improve physical strength. Calcining reduces the hydroxyl concentration generally in a uniform manner across a formed silica gel, such as a macrosphere. Whether a calcination step is done and the extent to which it is done are dictated by the particular application of the catalyst. For example, some applications require that the titanium sites on the silica be fairly well spaced apart. Because the titanium sites are ultimately located where hydroxyl sites previously were, then in such applications it is preferable to calcine to an extent such that the density of hydroxyl groups is sufficiently low. Other applications have different needs with respect to titanium density/spacing, concentration, and average number of hydroxyl groups to which a single titanium species is bound, and the extent of calcining can be adjusted accordingly to meet these needs.

Typically, the temperature of calcination is about 400 to 850° C., and steam calcination is carried out at about 50% humidity. As the calcination temperature and time are increased, a higher percentage of hydroxyl groups are removed, with temperature the more dominant factor. More specifically, the hydroxyl concentration decreases asymptotically relative to increasing temperature and time. Regardless of the calcination conditions, the hydroxyl distribution remains uniform.

In carrying out the drying and calcining steps, it is preferable to first ramp up to the drying temperature, maintain the formed silica hydrogel particles at the drying temperature for some time, then ramp up to the calcining temperature, and maintain the formed silica gel particles at the calcining temperature for some time. This procedure results in a catalyst having fairly good attrition resistance and strength. It is possible to simply ramp directly up to the calcining temperature, without maintaining the formed silica gel particles at the drying temperature for some time, but this procedure results in a catalyst having worse attrition resistance and strength.

After the calcining step, the next step in the method is to select a titanium precursor having a certain reactivity with hydroxyl groups. In particular, a titanium precursor with a relatively low reactivity is selected if it is desirable to attain a silica catalyst having a uniform distribution, and a titanium precursor with a relatively high reactivity is selected if it is desirable to attain a silica catalyst having an eggshell distribution. A titanium precursor having an intermediate reactivity is used if an intermediate distribution is desired. As mentioned above, however, the reactivity of the titanium compound is only one primary factor in determining the distribution type, and the molar titanium:hydroxyl ratio is the other. Thus, it is possible to attain a uniform distribution while using a titanium precursor with a relatively high reactivity by so dramatically increasing the molar titanium:hydroxyl ratio that the macrosphere is saturated and thus has a uniform titanium distribution.

On the other hand, the other factors of the system might be in a state which is highly responsive to the selected titanium precursor such that with one titanium precursor, the distribution is uniform whereas with a second titanium precursor, the distribution (with all other parameters the same) is eggshell. Regardless of the other system parameters, it can be said that a relatively low reactivity of a titanium precursor aids in forming a uniform distribution while a titanium precursor with a relatively higher reactivity aids in forming an eggshell distribution.

As used herein, the "reactivity" of the titanium precursor refers to the rate at which a particular precursor reacts with hydroxyl groups. This rate is typically determined by the number, size, and complexity of the functional groups attached to the titanium precursor. In general, as the size and complexity of the functional groups increase, the reactivity decreases. It has been determined that the rate of reaction with hydroxyl groups is very similar to its hydrolysis rate by water. Along these lines, some possible titanium precursors can be broken into two groups: A first group comprising titanocene, titanium acetylacetonate, isopropyl titanate-acetylacetone complex, and triethanolamine titanate, which are fairly complex and have a relatively slow reactivity, and second group comprising ethyl titanate, n-propyl titanate, isopropyl titanate, isobutyl titanate, and n-butyl titanate, which are not as complex and have a relatively fast reactivity. Other titanium precursors, such as 2-ethylhexyl titanate, may be used to form either a uniform, eggshell, or intermediate distribution depending on other system parameters, particularly the titanium:hydroxyl ratio. Preferably, if a uniform distribution is sought, isopropyl titanate-acetylacetone complex is the titanium precursor while isopropyl titanate is the preferred titanium precursor if an eggshell distribution is sought.

Step 5 of the method involves contacting the formed silica gel particles with the titanium precursor to form titanium-impregnated formed silica gel particles. The amount of titanium precursor is selected to achieve a molar titanium-:hydroxyl ratio, and this ratio and the reactivity of the precursor have been found to be the primary factors in determining the particular titanium distribution type. As used herein, the molar titanium:hydroxyl ratio is the moles of titanium available to react with hydroxyl, factoring in an equilibrium constant, relative to the number of moles of hydroxyl groups (as part of silanol groups) in the sample of formed silica gel particles.

A first, relatively high molar titanium:hydroxyl ratio aids in forming a uniform distribution, while a second, relatively low molar titanium:hydroxyl ratio aids in forming an eggshell distribution. Such a first molar titanium:hydroxyl ratio is from about 0.25:1 to about 3:1, preferably from about 0.5:1 to about 2:1, and the second molar titanium:hydroxyl ratio is from about 0.03:1 to about 0.25:1, preferably from about 0.05:1 to about 0.2:1, although each of these ranges could be higher or lower and vary over a wide range depending on other system parameters and conditions.

As discussed above in connection with reactivity, the fact that there are two contributing factors determining distribution type permits a distribution type to be achieved which is not typical based on values for one of the factors. For example, if a relatively high molar titanium:hydroxyl ratio is used (e.g., 0.26:1), but if a titanium precursor with an extremely high reactivity is also used, then an eggshell distribution can obtained. On the other hand, if a relatively low molar titanium:hydroxyl ratio is used (e.g., 0.1:1), but if a titanium precursor with an extremely low reactivity is also used, then a uniform distribution could be obtained. If both factors, however, are selected to favor a particular distribution type, then that distribution type is more easily attained. For example, a uniform distribution is attained if the titanium precursor is selected from titanocene, isopropyl titanate-acetylacetone complex, titanium acetylacetonate and triethanolamine titanate, and the molar titanium:hydroxyl ratio from about 0.5:1 to about 3:1. Similarly, an eggshell distribution is attained if the titanium precursor is selected from ethyl titanate, n-propyl titanate, isopropyl titanate, isobutyl titanate, and n-butyl titanate, and the molar titanium:hydroxyl ratio from about 0.05:1 to about 0.2:1.

The molar titanium:hydroxyl ratio is attained by first determining the amount of moles of hydroxyl groups which are present in a sample of dried (or calcined) macrospheres. This can be determined quantitatively by thermogravimetric analysis (TGA). Then, a specified amount of titanium precursor is dissolved in an organic solvent, based on the desired ratio and the equilibrium constant, which varies with the precursor. For example, if it is known that only 70% of a particular titanium precursor will react with hydroxyl groups, then the number of moles of titanium to be added is achieved by dividing the number of moles of hydroxyl groups by 0.7. It is important to note that changes in the molar ratio can be effected both by varying the amount of titanium precursor added and by varying the extent of calcining, as described above. In determining the amount of titanium to add, it is helpful noting that the concentration of titanium in the composite catalytic material increases asymptotically to a saturation point with increasing titanium concentration in solution. It also should be pointed out that increasing the concentration of titanium too high is wasteful, and the excess titanium should preferably be removed in that case.

Contacting the formed silica gel particles with the titanium precursor is carried out in a conventional manner. The titanium precursor is first mixed with an organic solvent to form a mixture. In a first embodiment, a sufficient amount of the mixture is added to the formed silica gel particles to only fill the pores of the formed silica gel particles. Thus, in this method, called the incipient wet method, there is no free solvent in the samples. In another embodiment, after mixing the titanium precursor with an organic solvent, the mixture is added to the formed silica gel particles to form a slurry.

This step is directed to contacting the formed silica gel particles with a titanium precursor to cause a reaction between the hydroxyl groups of the formed silica gel particles and the titanium, thereby impregnating titanium on and within the formed silica gel particles. The reaction is well known and involves the replacement of hydrogen of a silanol group with the titanium compound, as set forth as Equation 1 in U.S. Pat. No. 3,274,120 to Aftandilian. The reaction conditions and the manner in which this reaction is carried out are well known to those skilled in the art. For example, the formed silica gel particles according to the present invention may first be slurried in a suitable solvent and the titanium compound is dissolved in the same solvent to form a solution, then the slurry and the solution are combined to effect contact of the formed silica gel particles with the titanium compound. Typically, the titanium compound/solvent mixture is added to the slurry of gel while stirring, and stirring is continued for a period of time sufficient to permit an even reaction. The reaction can typically be carried out at room temperature, although the reaction conditions depend on the particular components chosen.

The titanium compound should be selected such that it is chemically inert relative to the organic solvent used, such that the reaction between the titanium compounds and the silanol groups predominates. Preferably, the titanium compound is an alkoxide, such as titanium isopropoxide or titanium butoxide when seeking to develop an eggshell distribution.

The sixth general step of the invention, recovering the titanium impregnated formed silica gel particles as a silica gel catalyst, is also carried out in a known manner. Often, prior to this final step, the formed silica gel particles having titanium impregnated therein are washed in a conventional manner with an organic solvent to remove excess titanium, e.g., titanium alkoxide. If this wash step is not done, then any excess titanium which is merely entrapped within the silica gel, as opposed to a titanium compound chemically bound to an oxygen atom of a silanol group, will remain therein and be converted to crystalline $TiO_2$, which is undesirable. In the event that a stoichiometrically equal amount of the titanium compound is used (or less than that amount) and the compound is fairly reactive with the silanol groups, then a wash step can be avoided. The wash solvent used is preferably the same organic solvent used to carry titanium in, and it can be any suitable organic solvent. The wash step is typically done at room temperature. The wash is continued until the effluent tests negative to water; that is, no precipitate is formed when water is added to the effluent.

Recovering the macrospheres having titanium impregnated therein as a silica gel catalyst involves separating the formed silica gel particles from the organic solvent (used as a wash) by conventional means. This may involve draining the organic solvent from the formed silica gel particles and then drying the formed silica gel particles. Draining contemplates merely allowing gravity to remove the excess liquid. Drying, which could include vacuum drying, involves bringing the formed silica gel particles to the boiling point of the organic solvent. The drying conditions may vary, but are carried out until nearly all of the organic solvent has vaporized.

The catalysts of the present invention may be used in gas or slurry phase epoxidation processes, both processes being known by those skilled in the art. Common catalytic reactions suitable for catalysis by a catalyst made by a process of the present invention include the oxidation of carbon monoxide to carbon dioxide and the epoxidation of propylene to propylene oxide. The catalyst can be used in a fixed bed as a formed particle (e.g., macrosphere or extrudate). The catalyst of the present invention might also have application in calatyzing the polymerization of olefins.

The epoxidation or oxidation utilizing a catalyst made by a process of the present invention may be conducted at a temperature in the range of from about 0 to 200° C. or higher and under atmospheric, subatmospheric or superatmospheric conditions. In a slurry polymerization, a suspension of a solid, particulate polymer is formed in a liquid polymerization medium containing a monomer or monomers, to which hydrogen and a catalyst are added. Solvents used in the polymerization medium include propane, isobutane, cyclopentane and the like. Gas-phase polymerization processes utilize superatmospheric pressures and temperature ranges of from about 80° C. to about 105° C. The epoxidation reaction is performed in a fixed bed, typically in a pressure vessel. In polymerization, monomers, hydrogen, and optionally an inert diluent gas, such as isobutane, are introduced into the vessel while maintaining the required temperature range. The formed polymer can be withdrawn continuously. The polymer obtained can be extruded and cut into the desired shapes.

EXAMPLES

The following examples will further illustrate the essential features of the present invention.

In Examples 1–8 shown in Table 1 below, a washed silica hydrogel was prepared in the following manner. A silica hydrosol was formed by simultaneously and instantaneously mixing aqueous solutions of sulfuric acid and sodium silicate. The concentrations and flow rates were adjusted so that the hydrosol contained about 12% $SiO_2$ and substantially all of the alkali metal present in the silicate solution is neutralized. The silicate/acid mixture was then forced through a conventional nozzle. From the nozzle, the mixture forms hydrosol beads in less than 1 second as the spheres are sprayed in air. These spheres were then delivered to an aging tank. The silica macrospheres were then aged at a pH of 9, at a temperature of from about 70° C. for 12 to 24 hours. After aging in this manner, the pH of the spheres was lowered to less than 5. Acidified water was used to remove most or all of the water-soluble salts from the silica hydrogel macrospheres. The average size of the macrospheres was about 4 mm. The dried silica gel particles had an average surface area of 320 $m^2/g$ (as shown below), an average pore volume of 1.1 cc/g, and a total surface hydroxyl content after drying only at 150° C. of about 4.6 $OH^-$ groups/$nm^2$ and after drying and calcining at 650° C. of 1.8 $OH^-$ groups/$nm^2$.

In Examples 1–7, the macrospheres were dried in the absence of moisture at 150° C. in a vacuum of less than 5 torrs for 4 hours to remove almost all water molecules. In Example 8, the dried macrospheres were also calcined at 650° C. for 4 hours in air, which reduced the hydroxyl content by about 60%. In Example 1, only enough liquid to fill the pore volume was used (i.e., the incipient wet method), while a slurry was formed in the remaining Examples, with the molar titanium:hydroxyl ratio as shown. In all Examples, the titanium precursor was first mixed with an organic solvent as shown in a ratio of organic solvent: silica gel=5:1.

TABLE 1

Ti/SiO$_2$ Catalyst Materials with Controlled Surface Distribution

| Macrosphere Sample | 1 | 2 | 3 | 4 | 5 | 6 | 7 | 8 |
|---|---|---|---|---|---|---|---|---|
| Silica Gel Pre-treatment | 150° C./Vac. | 150° C./Vac. | 150° C./Vac. | 150° C./Vac. | 150° C./Vac. | 150° C./Vac. | 150° C./Vac. | 650° C./Air |
| Preparation Method | Incipient Wet | Slurry XG | Slurry XG | Slurry XG | Slurry XG | Slurry XG | Slurry XG | Slurry XG |
| Ti Precursor/ Solvent | (n-BuO)$_4$Ti/ n-BuOH | (i-PrO)$_4$Ti/ IPA | (i-PrO)$_4$Ti/ IPA | (i-PrO)$_4$Ti/IPA | Complex 1:1/IPA | Complex 1:2/IPA | Cp$_2$TiCl$_2$/Toulene | Cp$_2$TiCl$_2$/Toulene |
| Ti, Weight % | 1.0 | 4.0 | 2.1 | 3.0 | 1.5 | 1.1 | 0.81 | 0.58 |
| Ti Spatial Distribution | Eggshell | Uniform | Eggshell | Intermediate | Intermediate | Uniform | Intermediate | Uniform |
| Silica Support Surf. Area | 320 $M^2/g$ | 320 $M^2/g$ | 320 $M^2/g$ | 320 $M^2/g$ | 320 $M^2/g$ | 320 $M^2/g$ | 320 $M^2/g$ | 320 $M^2/g$ |
| Ti/OH Ratio | 0.085:1 | 0.56:1 | 0.21:1 | 0.29:1 | 0.18:1 | 0.27:1 | 0.084:1 | 0.05:1 |

Cp$_2$TiCl$_2$ = Titanocene; XG = Xerogel; IPA = isopropanol; Complex (1) = 1 isopropyl titanate:1 acetylacetone; Complex (2) = 1 isopropyl titanate:2 acetylacetone The percent of titanium represents the weight percentage of the composite catalyst material (i.e., weight of titanium divided by total weight of silica and titanium combined) and was determined by Atomic Absorption. The type of distribution was determined by cutting a macrosphere in half and measuring the titanium concentration along its exposed diameter at various points by electron probe microanalysis at Micron Inc. of Wilmington, Del.

Figure 2:
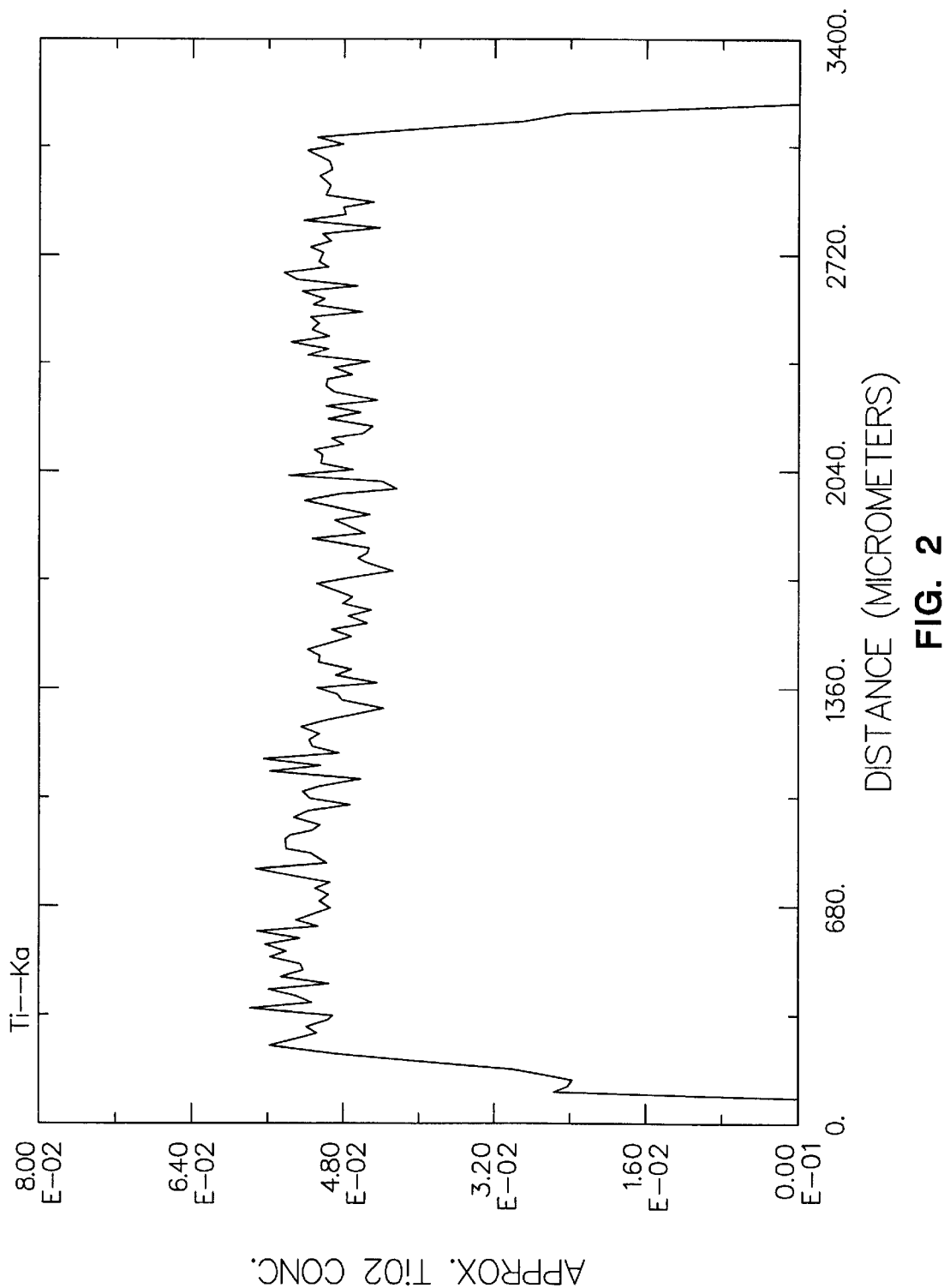
Figure 3:
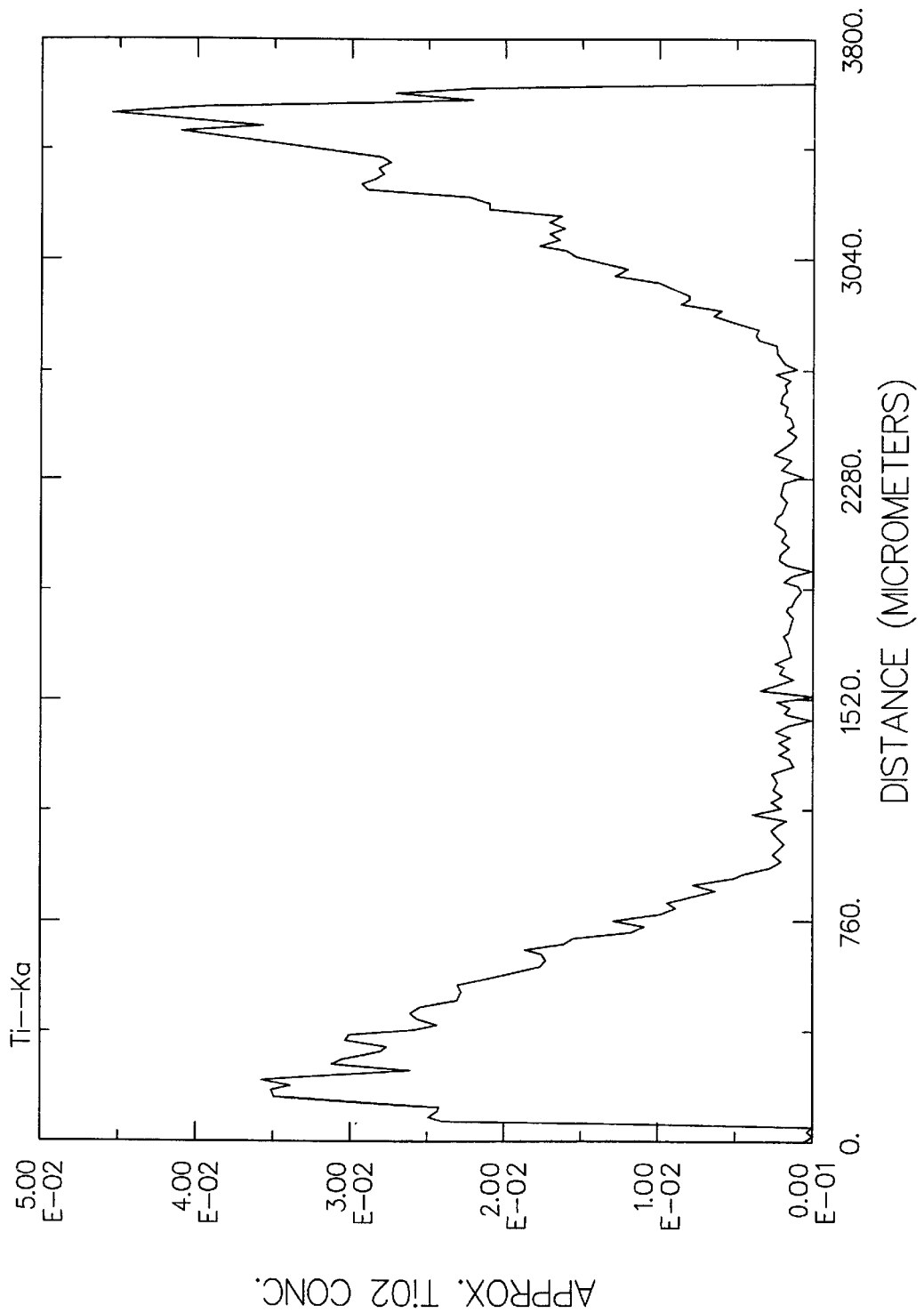
Figure 4:
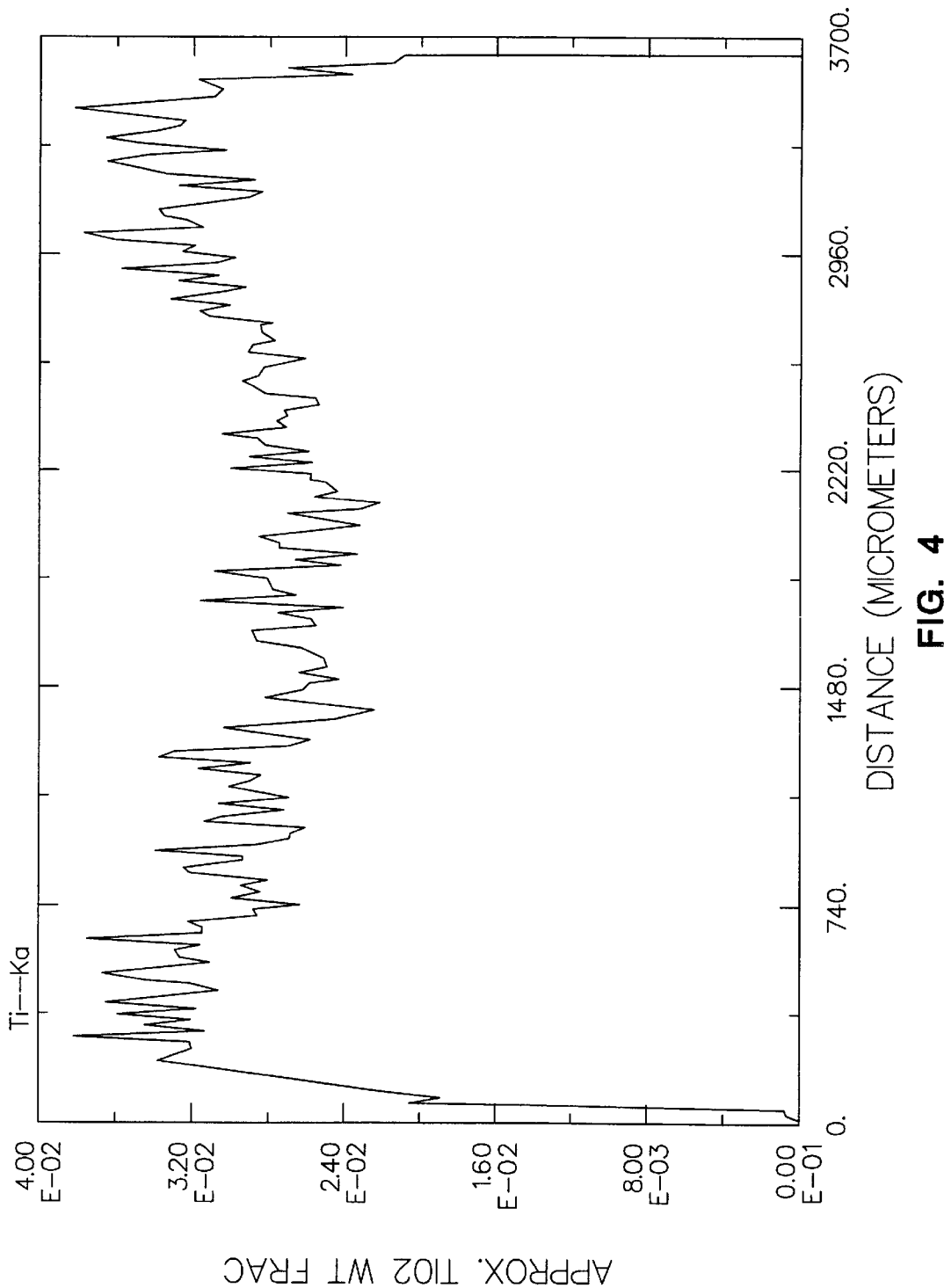
Figure 5:
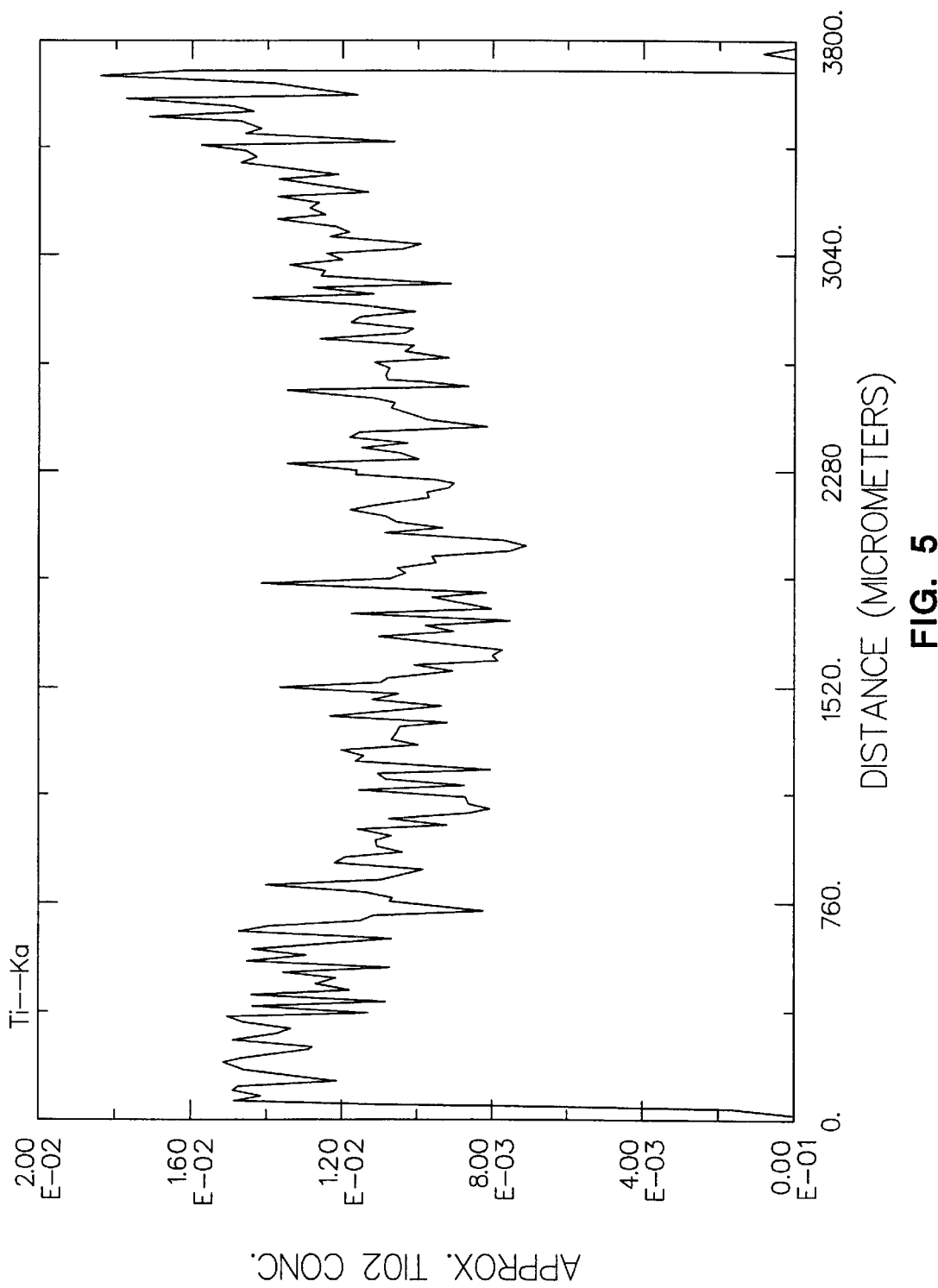
Figure 6:
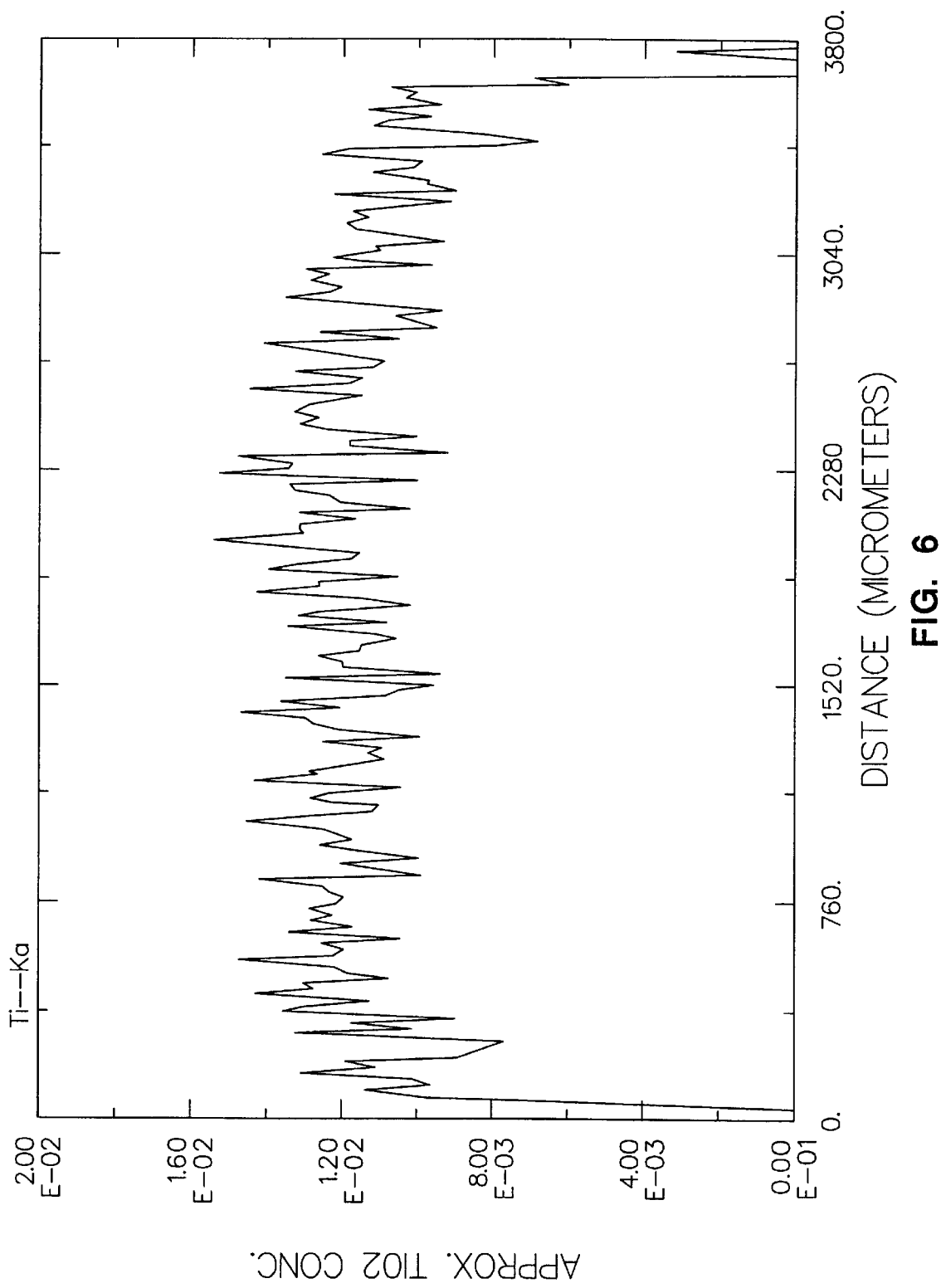
Figure 7:
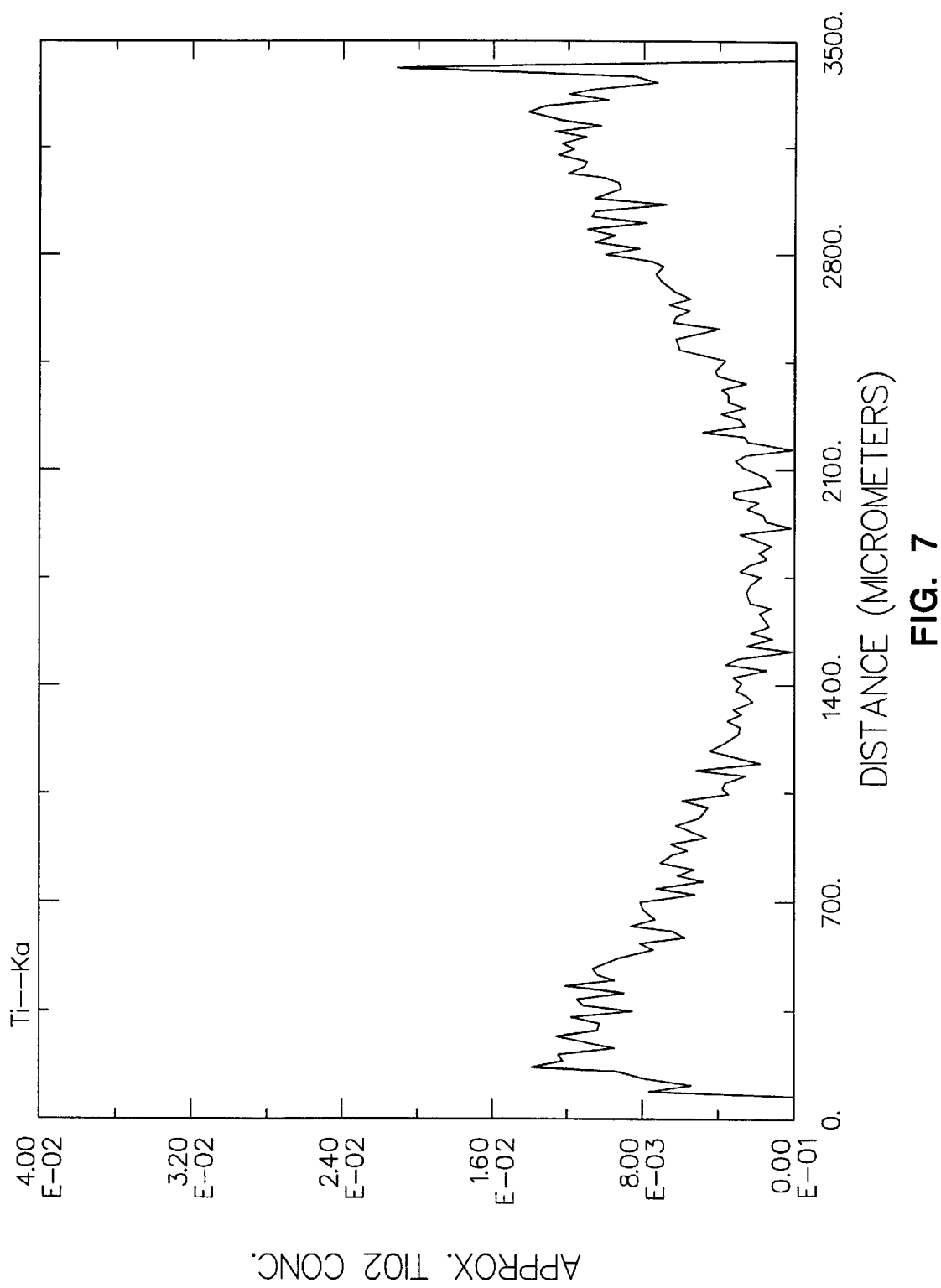
Figure 8:
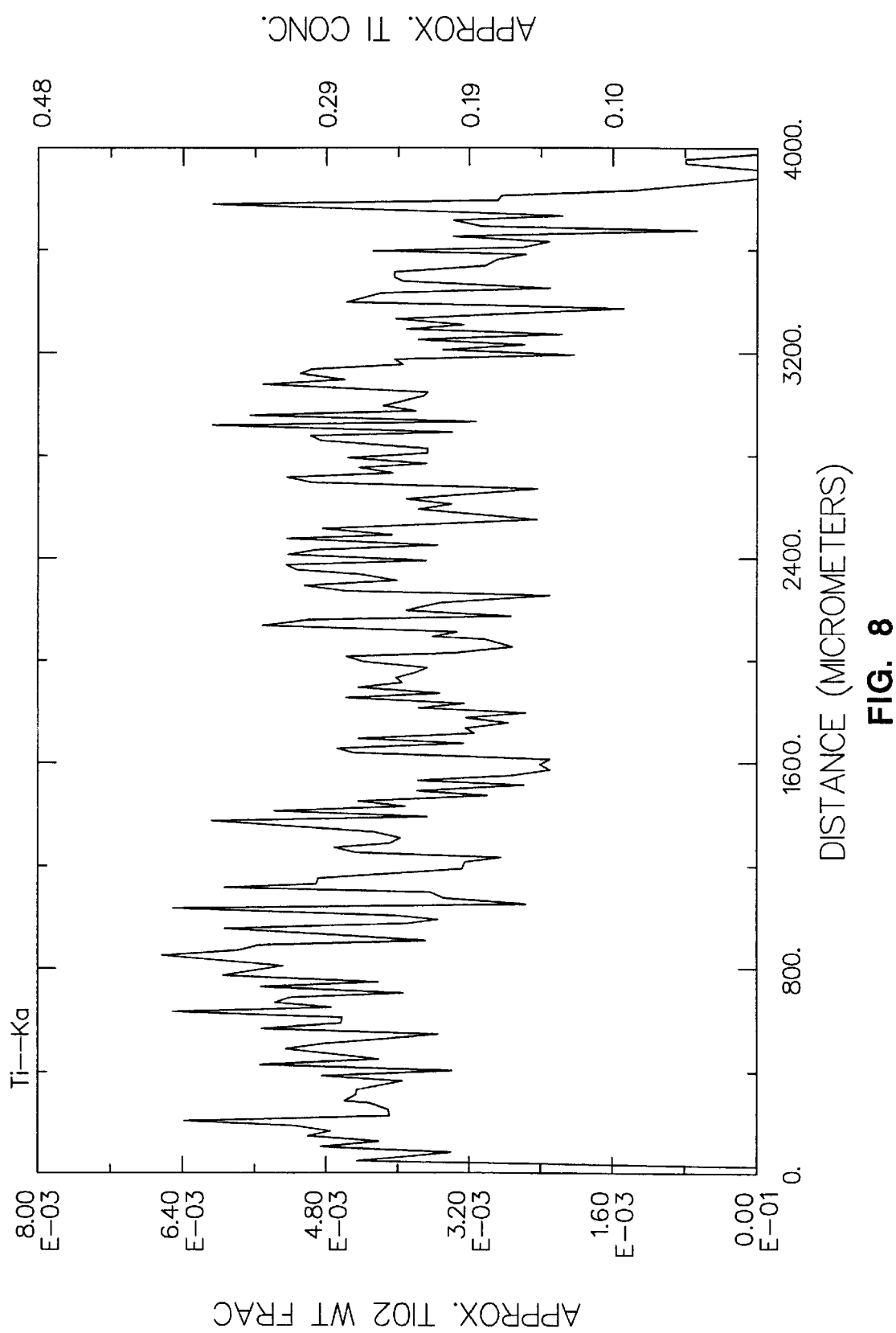

The results, which are graphically depicted in FIGS. 1–8, show that by choosing a combination of a particular reactive titanium precursor and a specific titanium:hydroxyl ratio, either uniform or eggshell distributions can be achieved consistent with the present invention. In particular, Examples 1 and 3 use both a low titanium:hydroxyl ratio and a fast-reacting titanium precursor to achieve an eggshell distribution. On the other hand, Example 2 uses a relatively high titanium:hydroxyl ratio to achieve a uniform distribution despite the use of a fast-reacting titanium precursor. Examples 5–8 show the effect of a complex, slow reacting titanium species to achieve either a uniform or intermediate distribution despite the use of a relatively low titanium:hydroxyl ratio.

Although illustrated and described with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for preparing a catalyst having a uniform distribution of titanium, said method comprising the steps of:
   preparing formed silica hydrogel particles containing water and having a hydroxyl concentration;
   drying said formed silica hydrogel particles to remove substantially all of said water;
   selecting a titanium precursor having a relatively low reactivity and selected from the group consisting of titanocene, titanium acetylacetonate, isopropyl titanate-acetylacetone complex, and triethanolamine titanate;
   contacting said formed silica gel particles having a diameter of about 2 mm to about 4 mm with said titanium precursor in an amount to achieve a molar titanium:hydroxyl ratio of at least about 0.05:1, wherein said ratio and said low reactivity contribute to form titanium-impregnated formed silica gel particles having a uniform distribution of titanium; and
   recovering said titanium-impregnated formed silica gel particles as said catalyst.

2. The method of claim 1 wherein said titanium precursor is isopropyl titanate-acetylacetone complex.

3. The method of claim 1 further comprising, after drying said formed silica hydrogel particles, calcining said formed silica gel particles for a time and at a temperature sufficient to reduce said hydroxyl concentration.

4. The method of claim 1, wherein the step of preparing formed silica hydrogel particles comprises mixing an alkali silicate solution with an acid to form a hydrosol and forcing said hydrosol through a nozzle to form said formed silica hydrogel particles.

5. The method of claim 1, wherein said titanium precursor is added in an amount to achieve a molar titanium:hydroxyl ratio of from about 0.25:1 to about 3:1.

6. A method for preparing a catalyst having an eggshell distribution of titanium, said method comprising the steps of:
   preparing formed silica hydrogel particles of silica hydrogel containing water and having a hydroxyl concentration;
   drying said formed silica hydrogel particles to remove substantially all of said water;
   selecting a titanium precursor having a relatively high reactivity and selected from the group consisting of ethyl titanate, n-propyl titanate, isopropyl titanate, isobutyl titanate, and n-butyl titanate;
   contacting said formed silica gel particles having a diameter of about 2 mm to about 4 mm with said titanium precursor in an amount to achieve a molar titanium:hydroxyl ratio from about 0.03:1 to about 0.2:1, wherein said ratio and said high reactivity contribute to form titanium-impregnated formed silica gel particles having an eggshell distribution of titanium; and
   recovering said titanium-impregnated formed silica gel particles as said catalyst.

7. The method of claim 6, wherein said titanium precursor is isopropyl titanate.

8. The method of claim 6 further comprising, after drying said formed silica hydrogel particles, calcining said formed silica gel particles for a time and at a temperature sufficient to reduce said hydroxyl concentration.

9. The method of claim 6, wherein the step of preparing formed silica hydrogel particles comprises mixing an alkali silicate solution with an acid to form a hydrosol and forcing said hydrosol through a nozzle to form said formed silica hydrogel particles.

* * * * *

UNITED STATES PATENT AND TRADEMARK OFFICE
CERTIFICATE OF CORRECTION

PATENT NO.    : 6,355,596 B2  
DATED         : March 12, 2002  
INVENTOR(S)   : Yatao Hu et al.

Page 1 of 1

It is certified that error appears in the above-identified patent and that said Letters Patent is hereby corrected as shown below:

<u>Title Page,</u>
Replace the ABSTRACT as follows:

-- ABSTRACT

A method for preparing a titanium on silica catalyst, in the form of formed particles such as macrospheres, achieves a controlled titanium distribution type, namely either uniform, eggshell, or intermediate, by selecting the particular titanium precursor depending on its reactivity with hydroxyl groups and by selecting the molar titanium:hydroxyl ratio. Selecting a titanium precursor with a low reactivity and/or adding sufficient titanium precursor to achieve a high molar titanium:hydroxyl ratio aids in forming a uniform distribution of titanium. On the other hand, selecting a titanium precursor with a high reactivity and/or adding only a little titanium precursor resulting in a low molar titanium:hydroxyl ratio aids in forming an eggshell distribution of titanium. In particular, the method involves first preparing formed particles, such as macrospheres, of silica hydrogel then drying the formed particles. Next, the formed particles are contacted with the titanium precursor, selected based on its reactivity and added in a suitable amount, both depending on the desired distribution type. Then, the titanium-impregnated formed particles are recovered as the catalyst. Preferred titanium precursors for aiding in the formation of an eggshell distribution of titanium include n-propyl titanate and n-butyl titanate, and preferred titanium precursors for aiding in the formation of a uniform distribution of titanium include titanocene and titanium acetylacetonate. Such silica on titanium catalysts can be used to make epoxidation catalysts, oxidation catalysts, hydroxylation catalysts, and the preferred distribution type depends on the particular application. --

Signed and Sealed this

First Day of October, 2002

*Attest:*

*Attesting Officer*

JAMES E. ROGAN  
*Director of the United States Patent and Trademark Office*